Oct. 30, 1956     E. G. KELLER     2,768,804
ADJUSTABLE SUSPENSION
Filed Dec. 19, 1952
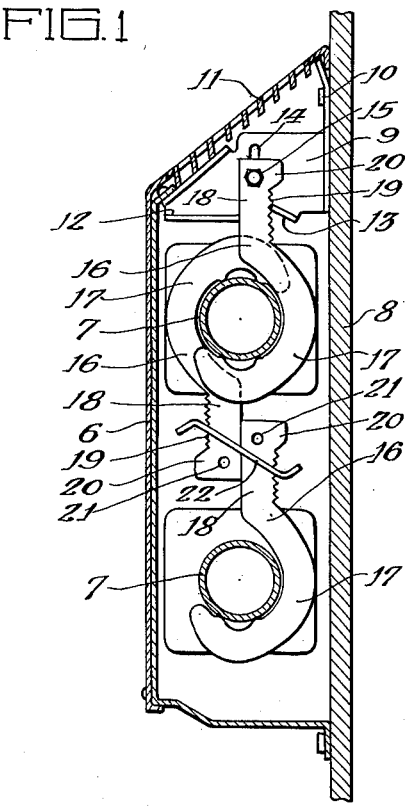
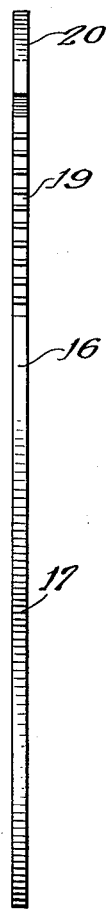
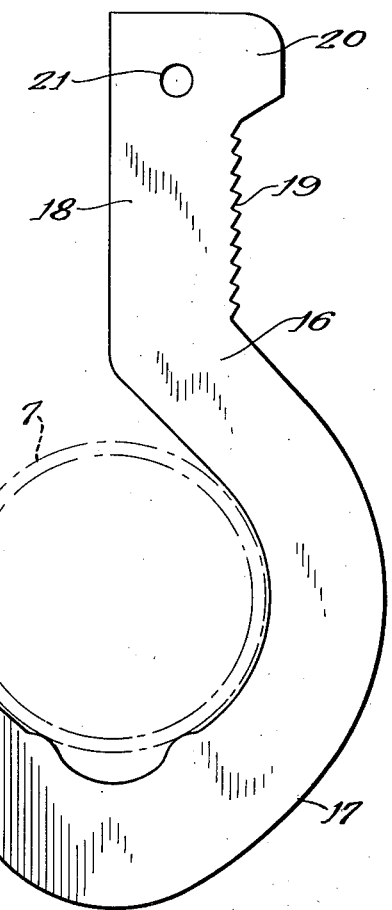
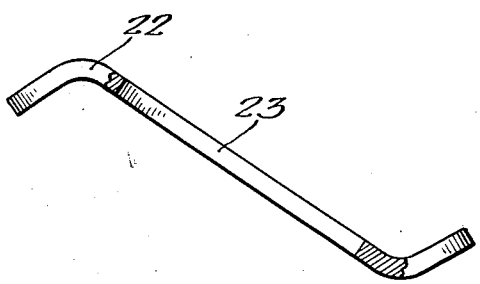
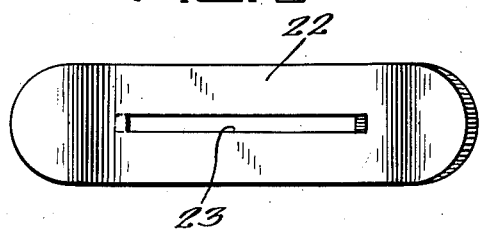
Inventor:
Edwin G. Keller
By Schroeder, Merriam,
Hofgren & Brady
Attorneys

United States Patent Office 2,768,804
Patented Oct. 30, 1956

2,768,804

ADJUSTABLE SUSPENSION

Edwin G. Keller, Michigan City, Ind., assignor, by mesne assignments, to Dunham-Bush, Inc., West Hartford, Conn., a corporation of Connecticut Application December 19, 1952, Serial No. 326,913

2 Claims. (Cl. 248—59)

This invention relates to a device for supporting pipes and the like, and more particularly to a suspension capable of adjustably supporting a series of heating pipes.

The primary object of this invention is to provide a simple and inexpensive suspension for adjustably supporting a series of heating pipes.

A further object is to provide a suspension capable of being easily readjusted if desired, after the heating pipes have been installed.

A further object of the invention is to provide a suspension which may be easily assembled and which has a minimum of parts.

The invention is illustrated in a preferred embodiment in the accompanying drawings, in which:

Fig. 1 is a vertical sectional view of the hook and link assembly in installed position;

Fig. 2 is an elevational view of one of the hooks;

Fig. 3 is a side elevational view of the hook shown in Fig. 2;

Fig. 4 is a sectional view of the fastening link; and

Fig. 5 is a plan view of the link shown in Fig. 4.

In the embodiment illustrated in Fig. 1, the suspension is shown installed in a baseboard heating system wherein a sheet metal box 6 encloses heating pipes 7 adjacent to a building wall 8. A top bracket 9 is bolted to the wall as indicated at 10 and may also serve to support a top grill 11 of the casing 6. The bracket has a horizontal flange 12 whose inner end portion serves as an abutment for the front of one of the hook shanks, and also has a lip 13 to engage a serrated face of the hook shank. The bracket is provided with a vertical slot 14 to receive a bolt 15 which holds the shank of the upper hook in adjusted position.

In order to support two pipes from the bracket 9, three identical hangers 16 are used. The hangers may be stamped out of heavy gauge sheet metal, and each has a hook portion 17 to receive one of the pipes, and a shank portion 18. Preferably, the shank is of rectangular cross section, and one face is provided with a series of serrations 19. The free end of the shank is provided with an enlarged shoulder 20 containing a hole 21 which may receive the bolt 15. To support a lower pipe, two of the hangers are secured together as shown in Fig. 1, by inverting one hook and bringing the inner faces of the shank portions into juxtaposition.

The shanks may be held together by means of a link member 22 having a slot 23 which is large enough to receive two of the shanks 18 in edge-to-edge relation. When the link is biased as shown in Fig. 1, the serrations 19 are each engaged by the link at the ends of the slot 23. Downward pressure on the lower pipe causes the link to draw the two adjacent faces of the shank together and a secure connection is provided. If it is desired to raise the position of the lower pipe, it is merely necessary to lift the hook 16 so that the link 22 may engage a lower tooth on the lower hanger or a higher tooth on the upper hanger. The shoulders 20 prevent accidental detachment of the two hook members, but each of the hooks can be removed from the link for convenience in shipment or handling.

While only two pipes are shown supported from the bracket 9, it will be understood that additional pairs of hooks may be provided for as many additional pipes as may be required.

The foregoing detailed description is given for clearness of understanding only, and no unnecessary limitations should be understood therefrom, for some modifications will be obvious to those skilled in the art.

I claim:

1. An adjustable suspension for hanging one pipe on another, comprising: a pair of similar hooks, each hook having a shank with an enlarged free end portion and at least two parallel faces, one of the faces being serrated, one of said hooks being inverted with respect to the other so that the shanks are in juxtaposition with each of their serrated faces extending outwardly in opposite directions, and a link in the form of a slotted bar embracing both shanks angularly so as to engage a serration in each serrated face and hold adjacent faces of the shanks together, the enlarged free ends of the shanks restraining the link from slipping off the shanks.

2. An adjustable suspension for hanging one pipe on another, comprising: a pair of similar hangers, each having a shank portion and a hook portion shaped to receive a pipe, the shank portion having a serrated face and a substantially planar face, the faces being disposed on opposite sides of said shank portion, one of the hooks being inverted with respect to the other so that the shank portions are in juxtaposition with each of their serrated faces extending outwardly in opposite directions and each of their substantially planar faces being positioned adjacent each other; and a slotted link embracing both shank portions angularly so as to engage a serration in each serrated face and maintain said adjacent planar faces together.

References Cited in the file of this patent

UNITED STATES PATENTS

| 309,038 | Flach | Dec. 9, 1884 |
| 545,774 | Clark | Sept. 3, 1895 |
| 546,462 | Beaton | Sept. 17, 1895 |
| 904,551 | Minnich | Nov. 24, 1908 |
| 1,105,748 | Braswell | Aug. 4, 1914 |
| 1,746,400 | Metzger | Feb. 11, 1930 |
| 1,792,574 | Desrosiers | Feb. 17, 1931 |
| 2,365,620 | Banneyer | Dec. 19, 1944 |

FOREIGN PATENTS

| 434,681 | Germany | Dec. 19, 1944 |